Nov. 25, 1952

M. L. POLANYI 2,619,003

TEMPERATURE COMPENSATING MEANS FOR
REFRACTOMETERS AND THE LIKE

Filed Dec. 3, 1949

INVENTOR
MICHAEL L. POLANYI

BY
*Louis L. Gagnon*
*Noble J. Williams*
ATTORNEYS

Patented Nov. 25, 1952

2,619,003

UNITED STATES PATENT OFFICE 2,619,003

TEMPERATURE COMPENSATING MEANS FOR REFRACTOMETERS AND THE LIKE

Michael L. Polanyi, Buffalo, N. Y., assignor to American Optical Company, Southbridge, Mass., a voluntary association of Massachusetts Application December 3, 1949, Serial No. 130,960

4 Claims. (Cl. 88—14)

This invention relates to optical measuring instruments, such as industrial refractometers and the like, and more particularly to automatic temperature compensating means constructed and arranged to function therewith so that correct optical measurements such as refractive index or percentage concentration may be obtained directly from reading the scale or reticule of the instrument without necessitating the use of auxiliary apparatus or complicated charts for obtaining said values.

Refractometers and the like are used extensively at the present time in the various fields of industry to obtain, by reading the scale thereof, an indication of the character of the material or solution being measured in the instrument such as its refractive index or percentage concentration. For example, in the sugar industry it is normal practice to use refractometers for measuring the percentage sugar concentration of sugar syrups and, heretofore, when such readings were taken it was necessary to have the temperature of the solution at the standard or normal temperature for the instrument or to make proper compensation or corrections for temperature before the correct percentage concentration value could be obtained. Thermometers, complicated charts and the like were often needed for such purposes, and a reason for such extra equipment was that while both the percentage concentrations of a solution and the temperature thereof influence the refractive index of the material neither influence is linear.

It has been found, however, that suitable temperature compensating means may be incorporated in and arranged to function with instruments of the character described when following the teachings of the present invention so as to substantially completely compensate for different temperatures at which the instrument may be ordinarily used so that correct readings of refractive indices, or percentage concentrations, may be taken directly from the scale or reticule of the instrument.

It is, accordingly, an object of the present invention to provide in a refractometer or the like a reading scale or reticule of predetermined characteristics and temperature compensating means for moving this scale or reticule through small distances in such a manner that the temperature of the material being measured in the instrument will be automatically compensated for so that the correct index or correct percentage concentration may be read directly from the scale or reticule of the instrument. The invention also includes a method for effecting such temperature compensation in a refractometer or like optical instrument.

A better understanding of the present invention may be had from the detailed description which follows when taken in conjunction with the accompanying drawings in which.

Figure 1:
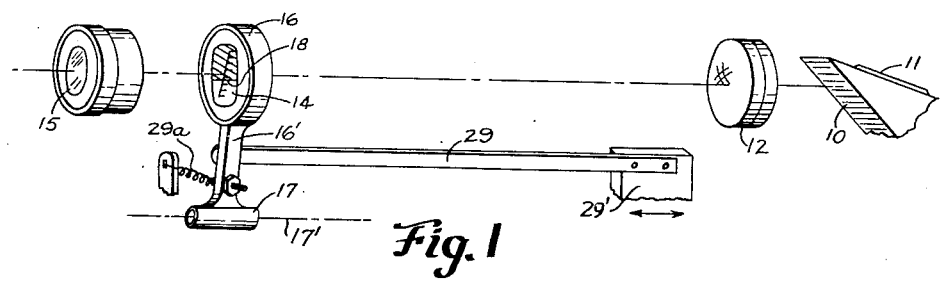
Fig. 1 is a diagrammatic sketch showing parts of a refractometer embodying the present invention.

Referring to the drawings in detail and particularly Fig. 1 wherein parts of a refractometer are schematically shown, a refracting measuring prism 10 is indicated in a position in optical alignment with an objective lens system 12 so that light from the material or solution being measured by the instrument, such as indicated at 11, will pass through the prism and through the objective and will be focused by the latter at a focal plane in which a reticule screen 14 is located. The screen is preferably in the form of a thin piece of ground glass or the like upon which a scale or reticule graduated in percentage concentrations or indices of refraction is carried, and in optical alignment therewith is an eye lens system 15 for reading the fine graduations of the scale. In such an instrument, a sharply defined boundary line or line of demarcation 18 is formed between the light and shaded areas appearing upon the screen and produced by the light from the prism focused thereon. It will be seen that the screen 14 is mounted in a ring 16 carried by an arm 16′ having a tubular base portion 17 arranged to swing about an axis 17′ which is parallel to the optical axis of the instrument.

If all the specimens being examined in a refractometer could be at all times maintained at a constant predetermined temperature, then it would only be necessary to properly calibrate the scale or recticule thereof and locate it at the proper position or level in the instrument relative to the boundary line cast by the material being measured to effect an arrangement of parts which would have correct readings of refractive indices or percentage concentrations for all specimens being examined within the normal range of the instrument. However, as previously stated, neither the refractive index nor the temperature of a given percentage concentration of a solid material dissolved in a solution, such as sugar dissolved in water, in a lineal function and, accordingly, to provide an intrument which will automatically read correctly for all percentage solutions and for all temperatures has been a difficult problem. By following the teachings of the invention, a single accurately calibrated scale or reticule may be obtained for such an instrument which will read correctly for all values of the instrument scale and for all temperatures within the range for which the instrument is designed.

Figure 2:
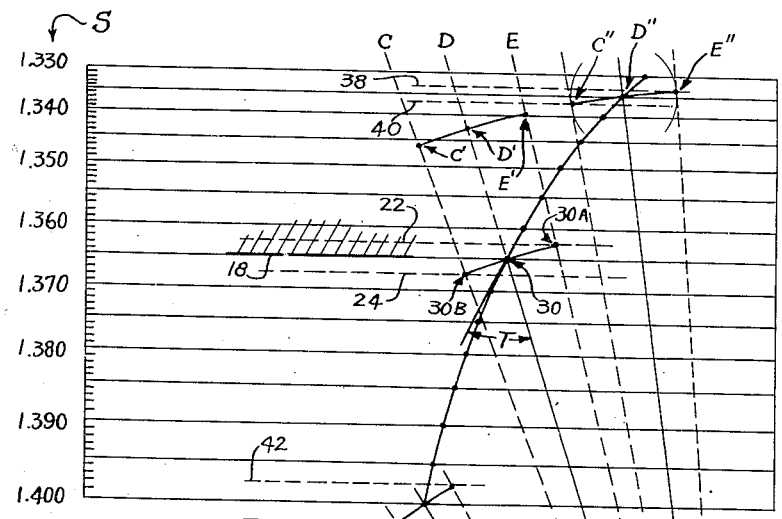
Fig. 2 is a sketch showing a preferred method of obtaining a temperature corrected scale or reticule for such an instrument.

Referring to Fig. 2, it will be seen that a refractive index scale of non-lineal characteristics may be represented at some normal or standard temperature, such as 20° C., such scale being indicated by the letter S with the larger graduations thereof reading from 1.330 to 1.400. If no corrections for changes in temperature were needed such a scale could be applied directly to the screen 14 of the instrument of Fig. 1 and correct readings could be had therefrom even though the spaces between the successive graduations are, in this case, gradually increasing as the index values increase. Thus, if we consider some particular index line on the scale, such as the line for an index of 1.365, and introduced into the refractometer a solution having an index of refraction of like value at 20° C., the boundary line 18 will coincide with line 1.365 such as is indicated in Fig. 2 with an unshaded area appearing below this line and a shaded area above indicating the shadow being cast by the prism.

Should the temperature of the material or solution change from the assumed standard temperature (in this instance taken as 20° C.) to a higher temperature, for example 30° C., this boundary line 18 would be displaced upwardly a definite small amount, such as indicated by dotted line 22. On the other hand, should the temperature be decreased an equal small amount, for example to 10° C., this boundary line 18 would move in the opposite direction from the line 1.365 a comparable amount, such as indicated by dotted line 24. If a small portion of the translucent screen 14 carrying the line 1.365, such as that immediately adjacent a point 30, is arranged to move, in response to some temperature responsive means such as the bi-metal element 29 shown in Fig. 1, a corresponding amount as such temperature changes occur, then point 30 on line 1.365 will always be in a proper location to coincide with the boundary line and will always provide a correct reading regardless of the temperature changes normally encountered during the use of such as instrument. Normally the quantity of material being measured by such an instrument is so small in comparison to the parts of the instrument surrounding the material that the material will without delay assume the temperature of the instrument. However, such an instrument at different times may have different temperatures (such depending upon its surroundings and the like) and, accordingly, temperature compensation is necessary. The bi-metal element 29 (Fig. 1) may be mounted upon an adjustable 29' and the arm 16' may be provided with a lightweight spring 29a secured to a fixed part of the instrument so as to hold arm 16' at all times in contact with the free end of the element 29.

In order to accomplish this temperature correction for all readings upon the scale or reticule a preferred manner is as follows: An azimuth line Z parallel to the boundary line 18 is drawn at a suitable working distance from line 18 and a point 0 is selected thereon to act as a pivotal center or axis (such as axis 17' in Fig. 1) about which the reticule point 30 may be moved. The point 0 is so chosen on line Z and with respect to point 30 that the radial or lever arm distance therebetween, indicated by solid line 31, will have an azimuth angle of Q which is preferably of a value appreciably more than 0° and appreciably less than 90°; the larger the needed correction is the nearer to 0 will be its azimuth angle, and the smaller this correction is the closer to 90° will be the value of the azimuth angle. Then if an arc with axis 0 as it center is swung upwardly and downwardly from the point 30 sufficient angular amounts, which amounts are represented by $d_1$ and $d_2$ (which are equal), by said temperature responsive means as a result of said temperature changes, this arc will intersect dotted lines 22 and 24 at two locations 30A and 30B, respectively, nearly equally spaced from the point 30. The temperature responsive means may be assumed to act, as indicated by arrow 32, upon lever arm distance 31 at some suitable locations 34 spaced from the axis 0 and will cause contact point 34 to move for said 10° increase so as to occupy the position 34A or to move in the opposite direction for said 10° decrease so as to occupy the position 34B.

It will be shown that other points for indicating other index (or percentage) readings, if properly located upon the movable reticule, may also be made to read correctly as such temperature changes occur. It will be appreciated that since the triangles COD and DOE indicate the amounts of angular displacement in opposite directions of point 30 carried by the reticule arm, all other parts of the reticule will be correspondingly angularly displaced for such temperature increases or decreases. Thus, there may be shown upon Fig. 2 upper and lower displacement positions for the 1.335 refractive index line for said temperature changes and such are indicated by dotted lines 38 and 40, respectively. Accordingly, to properly locate the correct point to be used on the screen or reticule for this index line 1.335 one may proceed as follows. At some proper location on the triangle COE an arc C'D'E' may be generated about the center point 0 which will be of such radial value that when the triangle COE is in effect swung about its center point 0 an amount indicated by azimuth angle Q' the arc C'D'E' will have its points C', D' and E' coincide with dotted line 40, index line 1.335 and dotted line 38, respectively, and such points of coincidence are indicated by C'', D'' and E'', respectively. In like manner there may be plotted for the refracted indices of the scale S temperature displacement values, such as indicated by lines 42 and 44 for index 1.400. Thus a series of points may be determined and accurately located upon the reticule to provide a refractive index scale, or percentage concentration scale, which may be read directly without requiring corrections to be made for ordinary variations in temperatures of the material or solution at the time the examination thereof is being made. It will be noted that in Fig. 2 the triangles employed for establishing the amounts of arcuate travel of the index points for establishing the different index points are all of the same angular value, such being the angular movement provided each by the bi-metal element 29.

Figure 3:
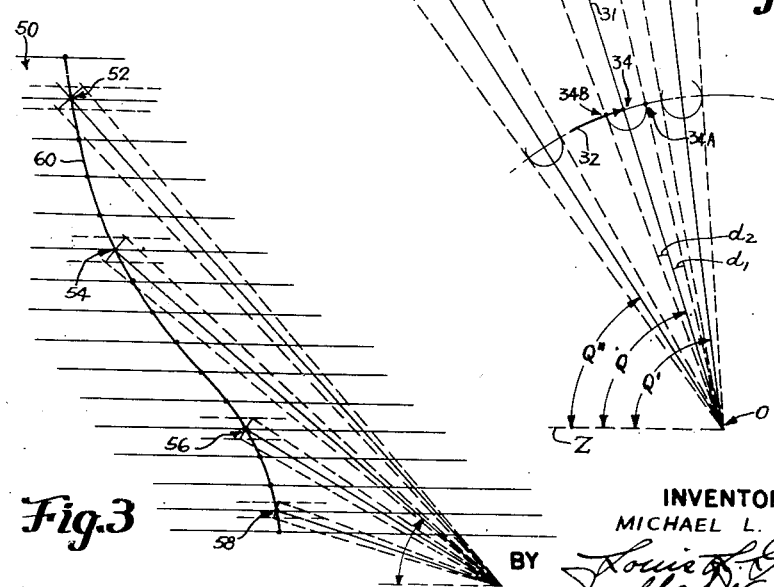
Fig. 3 is a sketch somewhat similar to Fig. 2 but showing further details of the invention.

In Fig. 3 is shown a part of another scale 50 but upon which the refractive index or percentage concentration lines have been indicated as having the spacings therebetween successively increasing instead of decreasing as was indicated on the scale in Fig. 2. In Fig. 3 the successive temperature corrections at different parts of the scale differ in a different manner from those disclosed in Fig. 2. Nevertheless, by following the teachings of the present invention, it will be possible to plot thereon, by selection of the right predetermined center point C and the proper spacing of the zero azimuth line from the boundary line, a series of temperature correction points if proper radial values for the arcs to be generated are used. Such a series of points have been plotted in Fig. 3, as indicated at points 52, 54, 56 and 58, so as to establish another set of values. It will be appreciated from inspection of Figs. 2 and 3, however, that the plotted points will not necessarily fall in a straight line or even in a smooth geometric curve. Nevertheless, the plotted line will be generally angularly disposed relative to the radius arm 31 for the reticule, such as is indicated by correction angle T in Fig. 2. At times the plotted curve on small scales will so closely approach a straight line that sufficient accuracy in the scale readings may be afforded by a straight line scale of mean values located at the angle T to the radius arm. For convenience in carrying out the method of obtaining a temperature corrected scale to be placed and used upon the screen 14, the diagrammatic sketches, such as Fig. 2 or 3, may be plotted on a large scale on graph paper or the like and when the position of a complete set of index values and their pivotal center have been obtained, such may be proportionally reduced and used for applying an engraved scale or the like upon screen 14.

Thus in the invention shown and described the scale or reticule thereof may be automatically moved by temperature compensating means so that each point thereon will occupy a proper position for giving directly correct readings of refractive index or percentage concentration when viewed through the eye piece of the instrument regardless of the ordinary temperature variations encountered at the time the instrument readings are being taken.

Having described my invention, I claim:

1. In a refractometer or like measuring instrument the combination of a measuring prism against which material the index of refraction or percentage concentration of which is to be measured may be placed, a screen upon which rays of light from said material and passing through said prism are focused, a scale of predetermined size and shape in juxtaposition to said screen and having a plurality of spaced reference points thereon for indicating different indices of refraction or percentage concentration of the material being measured, an objective lens system optically aligned with said prism and said screen for focusing said light rays upon said screen so as to establish thereon a sharply defined boundary line of total reflection between lighted and unlighted areas of said screen, means mounting said scale for transverse movement relative to the optical axis of said objective and along a predetermined curved path at an angle to said boundary line in such a manner that said different points on said scale will have different amounts of displacement in a direction at right angles to said boundary line when said scale is moved successive equal increments of travel along said curved path and relative to said optical axis, and temperature responsive means in said instrument arranged to cause said transverse movement between said scale and the optical axis of said objective so as to automatically compensate for the various temperatures at which measurements are being made.

2. In a refractometer or like measuring instrument the combination of a measuring prism against which material the index of refraction or percentage concentration of which is to be measured may be placed, a screen upon which rays of light from said material and passing through said prism are focused, a scale of predetermined size and shape in juxtaposition to said screen and having a plurality of spaced reference points thereon for indicating different indices of refraction or percentage concentration of the material being measured, an objective lens system optically aligned with said prism and said screen for focusing said light rays upon said screen so as to establish thereon a sharply defined boundary line of total reflection between lighted and unlighted areas of said screen, an arm supporting said scale for pivotal movement about a relatively fixed axis laterally spaced from said screen, said movement being in such a predetermined angular direction relative to said boundary line and said scale that at least some of said points of said scale will be afforded different amounts of displacement in a direction at right angles to said boundary line when said scale is moved successive small increments of travel about said fixed axis and relative to said optical axis, and temperature responsive means in said instrument arranged to cause relative transverse movement between said scale and the axis of said objective so as to automatically compensate for the various temperatures at which measurements are being made.

3. In a refractometer or like measuring instrument, the combination of a measuring prism against which material the index of refraction and percentage concentration of which is to be measured may be placed, a screen upon which rays of light from said material and passing through said prism are focused, a scale of predetermined size and shape in juxtaposition to said screen and having a plurality of spaced reference points thereon for indicating different indices of refraction or percentage concentration of the material being measured, an objective lens system optically aligned with said prism and said screen for focusing said light rays upon said screen so as to establish thereon a sharply defined boundary line of total reflection between lighted and unlighted areas of said sceren, means supporting said scale for movement about a relatively fixed axis relatively spaced a predetermined distance from said scale and with at least some of said points of said scale disposed at different predetermined distances from said fixed axis, and temperature responsive means arranged to cause relative transverse movement between said scale and the axis of said objective so as to automatically compensate for the various temperatures at which measurements are being made.

4. The method of forming a scale for use in a refractometer or like measuring instrument and which scale will provide, when properly installed in said instrument and actuated by temperature responsive means therein, accurate scale readings for different percentage concentrations or refractive indices of the substance for which said instrument is arranged, notwithstanding variations in temperature of said substance so long as said temperature is within the predetermined temperature range of said instrument; said method comprising the steps of providing a series of substantially parallel reference lines for use in establishing the size and shape of said scale, said lines being arranged in predetermined spaced relation to each other so as to accurately represent the deflections which the boundary line of total reflection will have on said scale in said instrument due to variations in percentage concentrations or index values taken at a single preselected temperature substantially midway of said predetermined temperature range, providing a pair of deflection lines adjacent and parallel to each reference line, and with the lines of each pair respectively spaced above and below its adjacent reference line amounts indicative of the total amount of upward and downward deflections which said boundary line would normally exhibit on said scale in said instrument due to the complete range of temperature changes for which said instrument is arranged if said scale were restrained against movement therein, selecting a pivotal axis laterally displaced and at a convenient distance relative to said reference lines so as to represent the axis about which said scale will be moved in said instrument by said temperature responsive means, locating a series of reference points or minute reference marks one of said reference points on each of said reference lines, respectively, and with each of said reference points being at such a radial distance from said pivotal axis that each reference point will coincide with the pair of deflection lines adjacent thereto and associated therewith when moved equal amounts in opposite directions from its initial location and about said pivotal axis and representative of the temperature range of said instrument, and forming a scale on an element adapted to be mounted in said instrument for indicating the relative location of and spacing between said reference points as a series and with the refractive index values or percentage concentration values of at least two of said points being indicated upon said element.

MICHAEL L. POLANYI.

REFERENCES CITED

The following references are of record in the file of this patent:

UNITED STATES PATENTS

| Number | Name | Date |
|---|---|---|
| 739,967 | Wohl et al. | Sept. 29, 1903 |
| 1,522,639 | Lowe | Jan. 13, 1925 |
| 1,760,209 | Pfeiffer | May 27, 1930 |
| 2,002,183 | Lecarpentier | May 21, 1935 |
| 2,065,114 | Cahn et al. | Dec. 22, 1936 |
| 2,168,353 | Linebarger | Aug. 8, 1939 |
| 2,267,115 | Linebarger | Dec. 23, 1941 |
| 2,421,854 | Seaman | June 10, 1947 |